United States Patent
Kim

(10) Patent No.: US 6,581,095 B1
(45) Date of Patent: Jun. 17, 2003

(54) APPARATUS FOR MATCHING A LARGE AMOUNT OF CONFIGURATION DATA BETWEEN EXCHANGER AND TELECOMMUNICATION MANAGEMENT NETWORK REPEATER IN CODE DIVISION MULTIPLE ACCESS SYSTEM AND CONTROL METHOD THEREOF

(75) Inventor: Seon-Mi Kim, Kyonggi-do (KR)

(73) Assignee: Hyundai Electronics Industries Co., Ltd., Kyonggi-do (KR)

( * ) Notice: Subject to any disclaimer, the term of this patent is extended or adjusted under 35 U.S.C. 154(b) by 0 days.

(21) Appl. No.: 09/471,904

(22) Filed: Dec. 23, 1999

(30) Foreign Application Priority Data

Dec. 31, 1998 (KR) ............................................. 98-62807

(51) Int. Cl.[7] ........................ G06F 15/177; G06F 15/16;
G06F 15/173; H04L 1/00; H04B 7/00;
H04B 7/14; H04B 7/216; H04Q 7/00; H04J 3/16;
H04J 3/22; H04J 3/24
(52) U.S. Cl. ........................ 709/220; 370/310; 370/315;
370/320; 370/335; 370/342; 370/232; 370/328;
370/474; 370/470; 709/202; 709/223
(58) Field of Search ........................ 370/232, 328,
370/474, 470, 315, 310, 320, 335, 342;
709/202, 220, 223; 395/500

(56) References Cited

U.S. PATENT DOCUMENTS

| | | | | |
|---|---|---|---|---|
| 4,156,798 A | * | 5/1979 | Doelz | 178/3 |
| 4,979,118 A | * | 12/1990 | Kheradpir | 370/232 |
| 5,526,415 A | | 6/1996 | Wakamoto | 379/230 |
| 5,729,548 A | * | 3/1998 | Holender | 370/474 |
| 5,764,955 A | * | 6/1998 | Doolan | 395/500 |
| 6,061,365 A | * | 5/2000 | Yeung et al. | 370/470 |
| 6,185,197 B1 | * | 2/2001 | Cheung Yeung et al. | 370/328 |
| 6,363,411 B1 | * | 3/2002 | Dugan et al. | 709/202 |
| 6,389,464 B1 | * | 5/2002 | Krishnamurthy et al. | 709/220 |

* cited by examiner

Primary Examiner—David Wiley
Assistant Examiner—Chau Nguyen
(74) Attorney, Agent, or Firm—J. Harold Nissen; Lackenbach Siegel

(57) ABSTRACT

Apparatus and method including a starting file storing portion for matching a large amount of configuration data between an exchanger and an initialized TMN repeater, and a modified file storing portion for storing modified information of configuration data managed by the exchanger, and outputting stored modified information to the TMN repeater after initialization, and if an operator stores exchanger configuration data into the starting file storing portion and stores modified configuration data into the modified file storing portion when initialization, the TMN repeater reads exchanger configuration data stored in the starting file storing portion, and updates corresponding managed object with read date. Then, the TMN repeater reads modified configuration data stored in the modified file-storing portion, and updates corresponding managed object with read data.

2 Claims, 2 Drawing Sheets

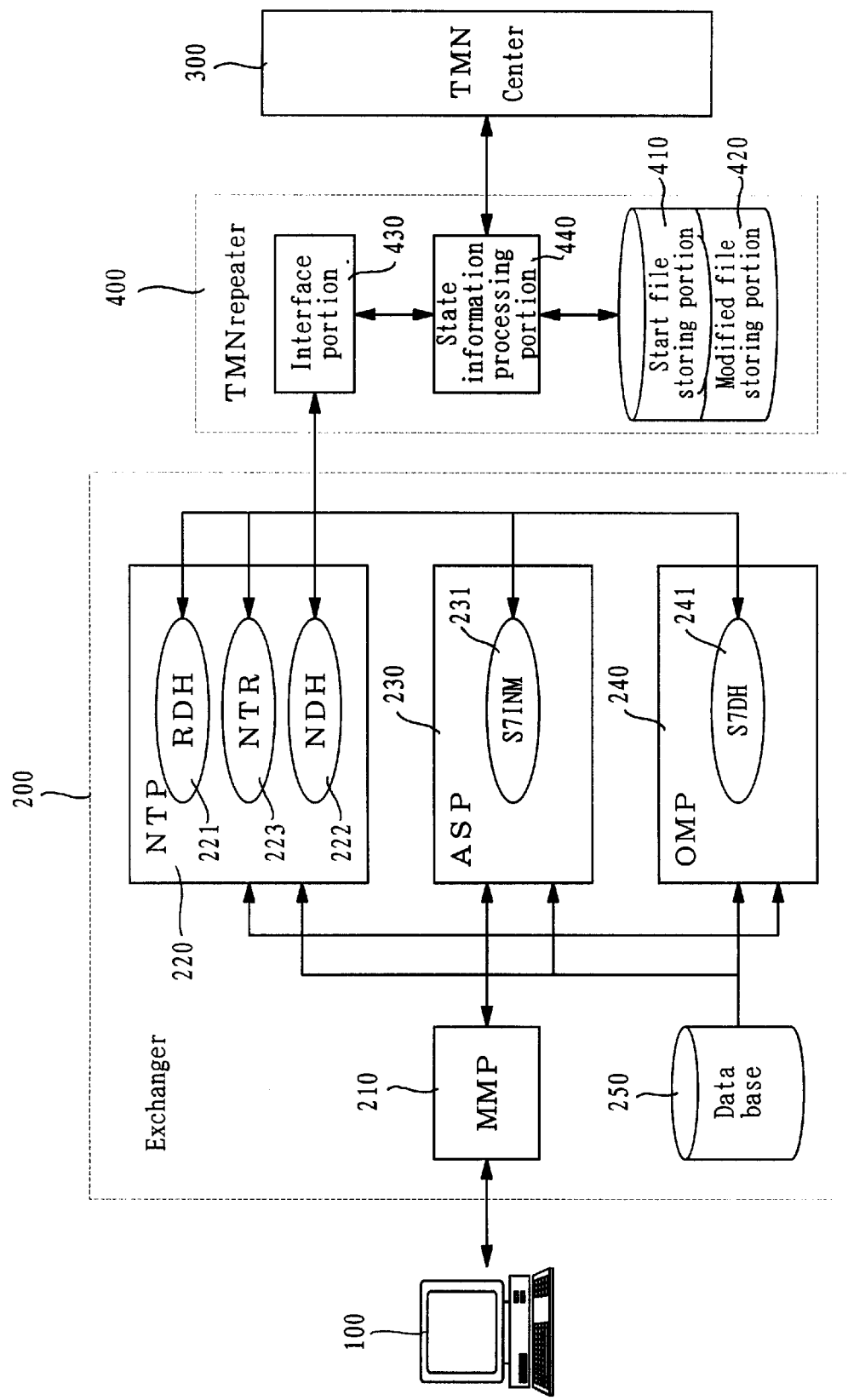

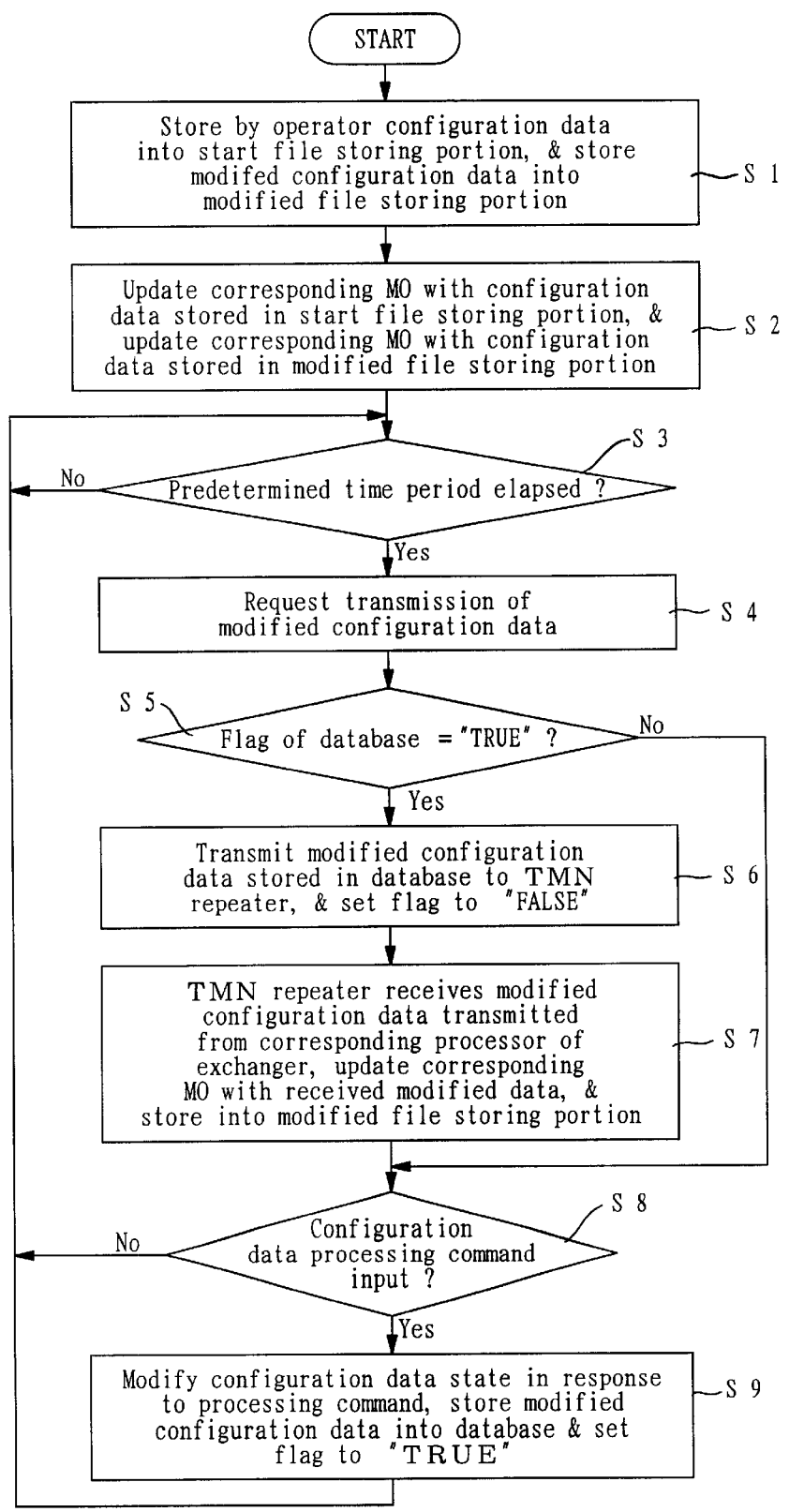

APPARATUS FOR MATCHING A LARGE AMOUNT OF CONFIGURATION DATA BETWEEN EXCHANGER AND TELECOMMUNICATION MANAGEMENT NETWORK REPEATER IN CODE DIVISION MULTIPLE ACCESS SYSTEM AND CONTROL METHOD THEREOF

BACKGROUND OF THE INVENTION

1. Field of the Invention

The present invention relates to an apparatus for matching data between an exchanger and a telecommunication management network (TMN) repeater in code division multiple access (CDMA) system and a control method thereof, and more particularly, to an apparatus for matching a large amount of configuration data between an exchanger and TMN repeater when the TMN repeater is initialized and a method of controlling the same.

2. Description of the Related Art

As widely known,, TMN is a standard network management method recommended by the International Telecommunication Union-Telecommunication Standardization Sector (ITU-T) M.3010. TMN is a network management method where each component of mobile communication network is analyzed in object-oriented view and expressed as a managed object (MO).

A conventional method of matching a large amount of data between an exchanger and TMN repeater in CDMA system outputs data read command signal to a man-machine interface processor(MMP) mounted at the exchanger so as to obtain configuration data managed by the exchanger when the TMN repeater performs initialization.

The above-mentioned configuration data refer to a trunk management information, signal point management information, and No. 7 protocol management information and the like.

MMP in the exchanger transmits the received data read command signal to the corresponding processors. Respective processors receive the data read command signal transmitted from MMP, and transmit the configuration data managed therein to TMN repeater.

Meanwhile, TMN repeater receives a large amount of configuration data output from respective processors of the repeater and updates the corresponding MO with the received data, to thereby complete initialization for matching the configuration data.

However, such a conventional method of matching a large amount of configuration data between an exchanger and TMN repeater in CDMA system is inefficient since in most cases such method is performed per exchanger. That is, when initialization is performed, a large amount of configuration data are input to TMN repeater, and each command is transmitted per exchanger so as to update the relevant MO. Thus, a long period of time is required for initialization of TMN repeater, and a communications loading between the exchanger and TMN repeater increases. In addition, MMP, an exclusive processor for handling commands, is heavily loaded, thus causing exchanger down. Further, processors for managing the configuration data are also heavily loaded, thereby causing a system error.

SUMMARY OF THE INVENTION

Therefore, it is an object of the present invention to provide an apparatus for matching a large amount of configuration data between an exchanger and TMN repeater in CDMA system, in which communication loading between the exchanger and TMN repeater and loading of exchanger processor for managing configuration data are minimized so as to provide a stable support for network management interface, and a method of controlling the same.

To accomplish the above object of the present invention, there is provided an apparatus for matching an exchanger and TMN repeater in CDMA system including an operator input portion for inputting command by an operator; an exchanger for managing configuration data in accordance with the operator command output from the operator input portion; a TMN center for designating specific processors mounted in the exchanger as standardized managed objects, storing configuration data managed by the specific processors into corresponding managed object, and managing the stored configuration data; and a TMN repeater made up of an interface portion and a state information processing portion and which interfaces the exchanger and the TMN center, the apparatus including a start file storing portion for storing configuration data of the exchanger required by the TMN repeater in accordance with the operator input and outputting the stored data to the TMN repeater when initialization is performed; and a modified file storing portion for storing modified information of the configuration data managed by the exchanger and outputting the stored modified information to the TMN repeater when initialization is performed.

To accomplish the above object of the present invention, there is provided a method of matching a large amount of configuration data between an exchanger and TMN repeater in CDMA system, the method including: a first step of storing configuration data of the exchanger required by the TMN repeater into a start file storing portion when an operator performs an initialization, and storing a modified configuration data into a modified file storing portion; a second step of reading by the TMN repeater the configuration data stored in the start file storing portion and updating corresponding managed object with the read data, and reading the modified configuration data stored in the modified file storing portion and updating corresponding managed object with the read data; a third step of determining whether a time period predetermined by the TMN repeater is elapsed or not; a fourth step of requesting the TMN repeater to transmit the modified configuration data to the exchanger, when the time period is determined as elapsed in the third step; a fifth step of determining whether a flag of database of a plurality of processors mounted in the exchanger is "TRUE" or not; a sixth step of reading the modified configuration data stored in the database at the fifth step, transmitting the read data to the TMN repeater, and setting the flag of the database to "FALSE"; a seventh step of receiving the modified configuration data from the TMN repeater, updating corresponding managed object with the received modified data, and storing the modified configuration data into the modified file storing portion; an eighth step of determining whether a configuration data processing command is input to the database at the fifth step, and performing the third step if it is determined that the configuration data processing command is not input; and a ninth step of modifying state of the configuration data in response to the configuration data processing command which is input at the eighth step, storing the modified configuration data into the database, setting the flag of the database to "TRUE", and performing the third step.

BRIEF DESCRIPTION OF THE DRAWINGS

The present invention will become more fully understood from the detailed description given hereinafter accompanying drawings, which are given by way of illustration only, and thus are not limitative of the present invention, and wherein:

FIG. 1 is a block diagram illustrating an apparatus for matching a large amount of configuration data between an exchanger and TMN repeater in CDMA system according to the present invention; and FIG. 2 is a flowchart illustrating a procedure of matching a large amount of configuration data between an exchanger and TMN repeater in CDMA system according to the present invention.

PREFERRED EMBODIMENTS OF THE PRESENT INVENTION

The present invention will be explained in more detail with reference to the attached drawings.

Referring to FIG. 1, an apparatus for matching a large amount of configuration data between an exchanger and TMN repeater in CDMA system includes an operator input portion 100, an exchanger 200 having a MMP 210, a number translation processor (NTP) 220, an access switching processor (ASP) 230, an operation and maintenance processor (OMP) 240, and a database 250, a TMN center 300, and a TMN repeater 400.

Operator input portion 100 serves to transmit a configuration data processing command which is input by an operator to MMP 210 of exchanger 200.

MMP 210 of exchanger 200 receives the configuration data processing command output from operator input portion 100, and transmits the command to processors such as NTP 220, ASP 230, and OMP 240.

NTP 220 in exchanger 200 serves to manage area code data and trunk data, and is made up of a route data handling (RDH) 221, number data handling block (NDH) 222, and number translation (NTR) 223.

Here, RDH 221 in NTP 220 serves to manage trunk data, and NDH 222 and NTR 223 serve to manage area number data.

ASP 230 in exchanger 200 serves to manage an overall state of NO. 7 protocol, and is made up of S7INM (NO. 7 Inter Network Management) 231.

S7INM in ASP 230 serves to manage NO.7 protocol-related data.

Meanwhile, OMP 240 in exchanger 200 serves to manage charging, arranging statistics, warning operations performed by exchanger 200, and consists of S7DH (NO. 7 data handling) 241.

At this time, S7DH 241 in OMP 240 serves to manage NO. 7 protocol-related data.

Database 250 in exchanger 200 is a memory for storing configuration data transmitted from respective processors 220, 230, and 240. If a flag of database 250 is "TRUE", it indicates that the configuration modified data is stored, and if the flag of database 250 is "FALSE", it indicates that the configuration modified data is not stored.

In the meantime, RMN center 300 designates specific processors provided in exchanger 200 as standardized MO, stores the configuration data managed by the specific processors into respective MO, and manages the same.

TMN repeater 400 serves to interface between exchanger 200 and TMN center 300, and is made up of a start file storing portion 410, modified file storing portion 420, interface portion 430, and state information processing portion 440.

Start file storing portion 410 stores the configuration data of exchanger 200 required for TMN repeater 400, and outputs the stored configuration data to state information processing portion 440 when initialization is performed.

Modified file storing portion 420 in TMN repeater 400 stores the configuration modified data managed by exchanger 200, and outputs the stored data to state information processing portion 440 when initialization is performed.

Interface portion 430 in TMN repeater 400 serves as an interface by receiving the configuration modified data output from the corresponding processor in exchanger 200, and transmitting the received data to state information processing portion 440.

State information processing portion 440 in TMN repeater 400 receives the configuration modified data transmitted from interface portion 430, updates corresponding MO with the received configuration modified data, and stores the configuration modified data into modified file storing portion 420.

A method of controlling an apparatus for matching a large amount of configuration data between the exchanger and TMN repeater in CDMA system according to the present invention will be explained.

TMN repeater 400 performs data initialization when it firstly operates or when it re-operates after system down. In step S1, an operator stores configuration data of exchanger 200 which is required by TMN repeater 400 into start file storing portion4 10 when initialization is performed, and simultaneously stores modified configuration data of exchanger 200 into modified file storing portion 420.

State information processing portion 440 in TMN repeater 400 reads the configuration data stored in start file storing portion 410 when initialization is performed, and updates corresponding MO with the read data. In steps S2, state information processing portion 440 in TMN repeater 400 reads modified configuration data stored in modified file storing portion 420, and updates corresponding MO with the read data.

In step S3, state information processing portion 440 in TMN repeater 400 determines whether a predetermined time period is elapsed so as to periodically require modified configuration data of exchanger 200.

When it is determined that a predetermined time period is elapsed in step s3, state information processing portion 440 of TMN repeater 400 outputs a transmission request signal to interface portion 430. In step S4, interface portion 430 outputs a transmission request signal for requiring transmission of configuration data to a plurality of processors in exchanger 200.

A plurality of processors 221 to 223, 231, and 241 repeatedly perform such operations as data modification when any modification occurs to configuration data managed by themselves, and storing of modified configuration data into database 250.

Here, a plurality of processors 221–223, 231, and 241 are RDH 221, NDH 222, NTR 223 of NTP 220, S7INM 231 of ASP 230, and S7DH 241 of OMP 240.

RDH 221 of NTP 220 serves to manage trunk data, and NDH 222 and NTR 223 serve to manage area code data. S7INM 231 of ASP 230 serves to manage NO. 7 protocol related data, and S7DH 241 of OMP 240 serves to manage NO. 7 protocol related data.

In step S5, a plurality of processors 221 to 223, 231, and 241 of exchanger 200 receive transmission request signal output from TMN repeater 400, and determines whether modified configuration data exists in database 250. Here, the determination by a plurality of processors 221 to 223, 231, and 241 of exchanger 200 on the existence of modified configuration data in database 250, is for determining whether the flag of database 250 is "TRUE" or not.

Then, a plurality of processors 221 to 223, 231, and 241 of exchanger 200 read the modified configuration data stored in database 250 when modified configuration data exists in database 250, and transmit the read data to TMN repeater 400. In step S6, a plurality of processors 221 to 223, 231, and 241 of exchanger 200 transmit the modified configuration data to TMN repeater 400, and set the flag of database 250 to "FALSE".

Meanwhile, interface portion 430 of TMN repeater 400 receives modified configuration data from exchanger 200, and transmits the same to state information processing portion 440. In step S7, state information processing portion 440 of TMN repeater 400 receives modified configuration data output from interface portion 430, updates the corresponding MO with the received data, and stores the modified configuration data into modified file storing portion 420.

In step S8, MMP 210 of exchanger 200 repeatedly determines whether a configuration data processing command is input via operator input portion 100 or not.

MMP 210 of exchanger 200 transmits to the corresponding processor the configuration data processing command which is input via operator input portion 100. Subsequently, the corresponding processor of exchanger 200 receives the configuration data processing command transmitted from MMP 210, and modifies state of the configuration data in response to the processing command. In step S9, the corresponding processor stores the modified configuration data into database 250, and sets the flag of database 250 to "TRUE". Then, the process returns to step S3.

As described above, in the present invention, the TMN repeater updates the relevant MO with the configuration data which is stored in the start file storing portion and modified file storing portion when initialization is performed. Then, only the configuration data which is modified in the exchanger is input and updated, thus eliminating the need of transmitting a large amount of commands in order to receive configuration data managed by the corresponding process. As a result, communications loading between the exchanger and TMN repeater and loading of corresponding processor of exchanger for managing the configuration data can be minimized, which allows stabilized network management interface.

What is claimed is:

1. An apparatus for matching an exchanger and TMN repeater in CDMA system in which said CDMA system comprising:

an operator input portion for inputting command by an operator;

an exchanger for managing configuration data in accordance with operator command output from said operator input portion;

a TMN center for designating specific processors mounted in said exchanger to standardized managed objects, storing configuration data managed by said specific processors into corresponding managed object, and managing stored configuration data; and a TMN repeater made up of an interface portion and a state information processing portion and which interfaces said exchanger and said TMN center, said apparatus comprising:

a start file storing portion for storing configuration data of said exchanger required by said TMN repeater in accordance with said operator input, and outputting stored data to said TMN repeater when initialization is performed; and a modified file storing portion for storing modified information of configuration data managed by said exchanger, and outputting stored modified information to said TMN repeater when initialization is performed.

2. A method of matching a large amount of configuration data between an exchanger and TMN repeater in CDMA system, said method comprising:

a first step of storing configuration data of said exchanger required by said TMN repeater into a start file storing portion when an operator performs an initialization, and storing a modified configuration data into a modified file storing portion;

a second step of reading by said TMN repeater configuration data stored in said start file storing portion and updating corresponding managed object with read data, and reading modified configuration data stored in said modified file storing portion and updating corresponding managed object with read data;

a third step of determining whether a time period predetermined by said TMN repeater is elapsed or not;

a fourth step of requesting said TMN repeater to transmit said modified configuration data to said exchanger, when the time period is determined as elapsed in said third step;

a fifth step of determining whether a flag of database of a plurality of processors mounted in said exchanger is "TRUE" or not;

a sixth step of reading said modified configuration data stored in said database at said fifth step, transmitting read data to said TMN repeater, and setting flag of said database to "FALSE";

a seventh step of receiving said modified configuration data from said TMN repeater, updating corresponding managed object with received modified data, and storing the modified configuration data into said modified file storing portion;

an eighth step of determining whether a configuration data processing command is input to said database at said fifth step, and performing said third step if it is determined that the configuration data processing command is not input; and a ninth step of modifying state of said configuration data in response to said configuration data processing command which is input at said eighth step, storing modified configuration data into said database, setting said flag of the database to "TRUE", and performing said third step.

* * * * *